(12) United States Patent
Keisling et al.

(10) Patent No.: US 10,208,901 B2
(45) Date of Patent: Feb. 19, 2019

(54) PORTABLE LIGHTING DEVICE

(71) Applicant: Koehler-Bright Star LLC, Hanover Township, PA (US)

(72) Inventors: Jeff Keisling, Clarks Summit, PA (US); Mark Dirsa, Shavertown, PA (US)

(73) Assignee: KOEHLER-BRIGHT STAR LLC, Hanover Township, PA (US)

( * ) Notice: Subject to any disclaimer, the term of this patent is extended or adjusted under 35 U.S.C. 154(b) by 0 days.

(21) Appl. No.: 15/066,727

(22) Filed: Mar. 10, 2016

(65) Prior Publication Data

US 2017/0023189 A1    Jan. 26, 2017

Related U.S. Application Data

(60) Provisional application No. 62/130,844, filed on Mar. 10, 2015.

(51) Int. Cl.
| | |
|---|---|
| *F21L 4/02* | (2006.01) |
| *F21V 23/04* | (2006.01) |
| *H05B 33/08* | (2006.01) |
| *F21V 33/00* | (2006.01) |
| *F21V 23/00* | (2015.01) |
| *A42B 3/04* | (2006.01) |
| *H05B 37/02* | (2006.01) |
| *F21Y 115/10* | (2016.01) |

(52) U.S. Cl.
CPC ............... *F21L 4/02* (2013.01); *A42B 3/044* (2013.01); *A42B 3/0446* (2013.01); *F21V 23/003* (2013.01); *F21V 23/04* (2013.01); *F21V 23/0407* (2013.01); *F21V 23/0471* (2013.01); *F21V 23/0492* (2013.01); *F21V 33/0064* (2013.01); *H05B 33/0803* (2013.01); *H05B 33/0854* (2013.01); *H05B 37/0218* (2013.01); *H05B 37/0227* (2013.01); *F21Y 2115/10* (2016.08); *Y02B 20/46* (2013.01)

(58) Field of Classification Search
CPC .. F21V 23/0407; F21V 23/04; F21V 33/0064; F21V 23/0492; F21V 23/0471; F21V 23/003; F21L 4/02; A42B 3/044; A42B 3/0446; H05B 33/0854; F21Y 2115/10
See application file for complete search history.

(56) References Cited

U.S. PATENT DOCUMENTS

| | | | |
|---|---|---|---|
| 2011/0289658 A1* | 12/2011 | Knoepfli | A42B 3/0433 2/410 |
| 2013/0329439 A1* | 12/2013 | Hellkamp | F21V 23/003 362/464 |

\* cited by examiner

*Primary Examiner* — Kevin Quarterman
(74) *Attorney, Agent, or Firm* — Levenfeld Pearlstein, LLC

(57) ABSTRACT

A portable lighting device includes a main front lamp directed in a first direction, an auxiliary lamp directed in a second direction different from the first direction and a controller connected to the auxiliary lamp so as to selectively illuminate the auxiliary lamp.

9 Claims, 4 Drawing Sheets

PORTABLE LIGHTING DEVICE

BACKGROUND

The present disclosure relates generally to lighting systems and methods and, in particular, to a portable lighting device that may include motion, orientation and/or illumination intensity control and associated methods.

Working in a dark and space restrictive environment may present a number of hazards and lighting challenges. As an example, a coal mine often includes miners sharing limited space with heavy equipment in a dark environment. As a result, a miner risks being struck by a piece of equipment if the operator of the equipment cannot see the miner. This is especially true if the miner is not facing the piece of equipment (so that the miners cap lamp shines in another direction) or the miner squats down or bends over or is working in a ditch so as to be further shielded from the equipment operator's field of view.

Furthermore, while a miner's cap lamp provides the miner with illumination in the forward direction, the miner's peripheral views typically are not lit or are poorly lit by straying light from the cap lamp main front lamp. As a result, a miner may not see a piece of equipment approaching from, or moving on, the side and become injured due to unintentional contact with the equipment. Alternatively, the miner may not see a sidewall of the mine or other obstacle with his peripheral vision due to darkness and run into it.

In addition, while cap lamps may provide good illumination as the miner looks into the distance, the bright light provided by the cap lamp may become blinding to the miner due to reflection if he is looking directly at a surface or an object up close.

Other types of workers, including but not limited to rescue personnel such as firefighters, may face similar issues in dark, smoky and space restrictive environments such as burning structures.

Accordingly, a need exists for a cap lamp, a cap lamp system and/or method that addresses at least some of the above issues.

SUMMARY

A portable lighting device includes a main front lamp directed in a first direction, an auxiliary lamp directed in a second direction different from the first direction and a controller connected to the auxiliary lamp so as to selectively illuminate the auxiliary lamp. In an embodiment, the controller flashes the auxiliary lamp.

In an embodiment the portable lighting device includes an orientation sensor connected to the controller, such that the controller activates the auxiliary lamp when the orientation sensor detects tilting or downward movement. The portable lighting device can also include, with or without the orientation sensor, an external motion detector connected to the controller, such that the controller illuminates the auxiliary lamp when movement is detected by the external motion detector.

The auxiliary lamp can be a first side lamp and the device can include a second side lamp connected to the controller, a first external motion detector corresponding to the first side lamp and a second external motion detector corresponding to the second side lamp. In one arrangement, the first and second external motion detectors are connected to the controller and the controller illuminates the first side lamp when movement is detected by the first external motion detector and the controller illuminates the second side lamp when movement is detected by the second external motion detector.

In an embodiment, the portable lighting device can include an illumination intensity sensor connected to the controller, such that the controller is configured to dim the main front lamp when a light intensity detected by the illumination intensity sensor rises above a predetermined level.

The portable lighting device can be configured as a cap lamp.

The device can further include a housing and a battery connected to the controller and the main front lamp and the auxiliary lamp. In such an arrangement, the battery, the controller, the main front lamp and the auxiliary lamp can be positioned within the housing.

An embodiment of a portable lighting device for retrofitting a cap lamp system that includes a cap lamp adapted to attach to a helmet, a battery pack and a power cord supplying power from the battery pack to the cap lamp, includes a housing adapted to be attached to the helmet and an auxiliary lamp positioned in the housing. In one arrangement, the auxiliary lamp is adapted to be selectively illuminated by the battery pack. The auxiliary lamp can be configured to flash.

The portable lighting device can further include a controller and an orientation sensor connected to the controller, such that the controller activates the auxiliary lamp when the orientation sensor detects tilting or downward movement. The portable lighting device can further include a switch for manually activating the auxiliary lamp.

DETAILED DESCRIPTION

Figure 1:
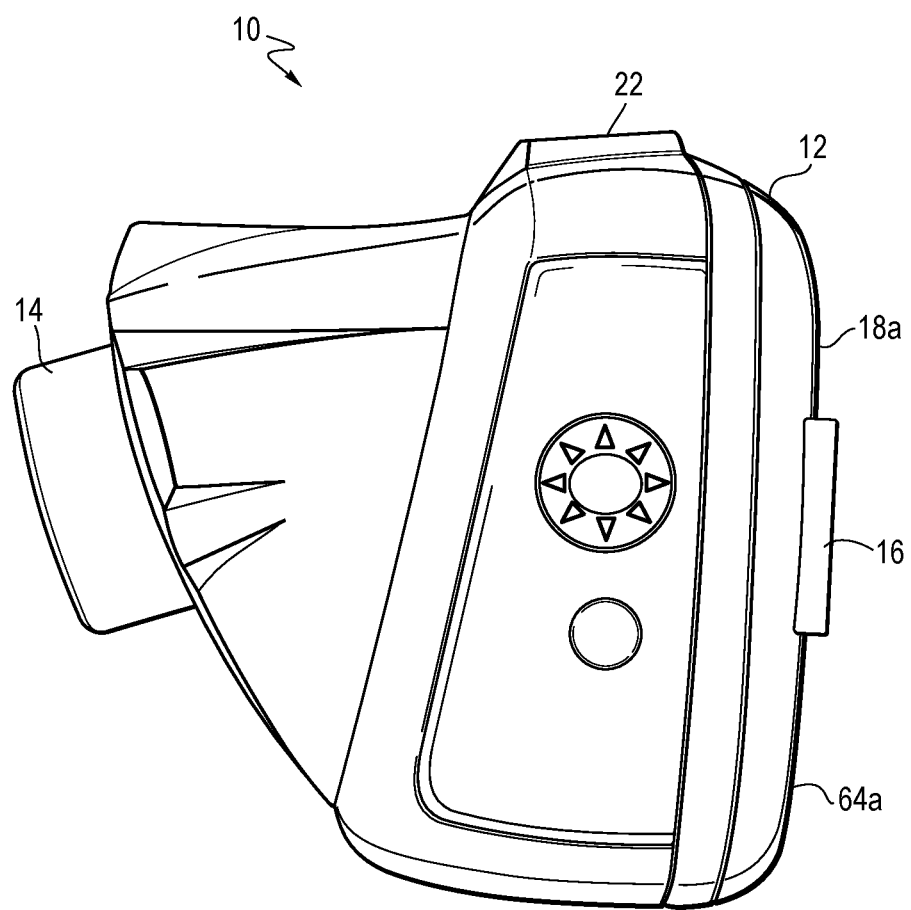
FIG. 1 is a side perspective view of an embodiment of the portable lighting device of the invention.

An embodiment of a portable lighting device is indicated in general at 10 in FIG. 1. While the description below is directed to an embodiment where the portable lighting device is a cap lamp as used in mines, the portable lighting device may alternatively be a cap lamp used in other environments, a hand held flashlight, a portable light that otherwise attaches to a user or any other type of portable light.

Figure 2:
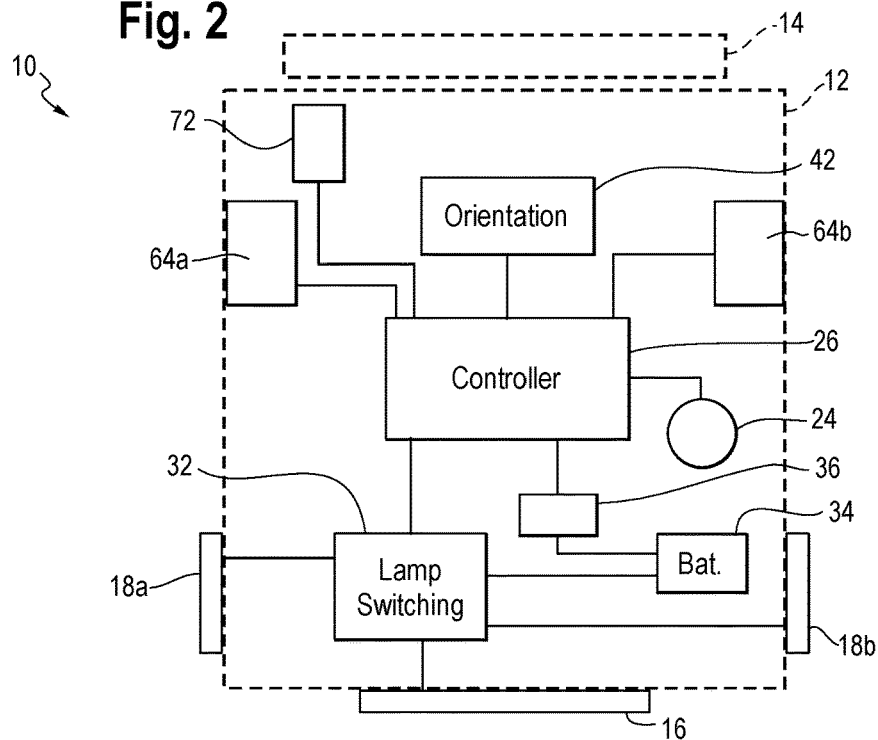
FIG. 2 is a schematic of the portable lighting device of FIG. 1.

As illustrated in FIG. 1, the cap lamp includes a housing 12, a main front lamp 14, a tail lamp 16 and side lamps 18a and 18b (FIG. 2). Each lamp preferably is at least one light emitting diode (LED), but may be any other type of lamp known in the industry.

While the main front lamp 14 is activated by a conventional switch (22 in FIG. 1), as known in the art, the tail lamp 16 and side lamps 18a an 18b may be activated by an auxiliary lamp control switch, indicated at 24 in FIG. 2. Auxiliary lamp control switch 24 may be configured to manually turn the tail lamp 16 and side lamps 18a and 18b on individually or together. Auxiliary lamp control switch may also have a setting so that the cap lamp controller activates the tail lamp and side lamps in the manner described below. Of course control of the main front lamp 14 may alternatively be incorporated into switch 24 as well so that the separate, dedicated main front lamp control switch 22 is unnecessary.

As illustrated in FIG. 2, the cap lamp includes a programmable logic controller 26 that communicates with auxiliary lamp switching module 32. The lamp switching module 32 is electrically connected to a battery 34 and the tail lamp 16 and side lamps 18a and 18b. The battery is connected to a transformer 36 so that the appropriate power is provided to the controller 26. While the battery 34 is preferably a lithium-ion battery, any type of battery may be used. In addition, while FIG. 2 shows the battery 34 positioned within the cap lamp housing 12, the battery could instead be positioned in a separate battery pack that is worn on the user's waist and connected to the cap lamp housing via a cord (as known in the art and shown in FIG. 4) and the components within the cap lamp housing.

An orientation sensor or motion sensor 42 is also connected to the controller. The motion/orientation sensor sends a signal to the controller when the cap lamp 10 is either moved in the downward direction or tilted forward or backward. The controller uses this indication as will now be described with respect to FIG. 3. Suitable motion/orientation sensors are well known in the art and readily available.

Figure 3:
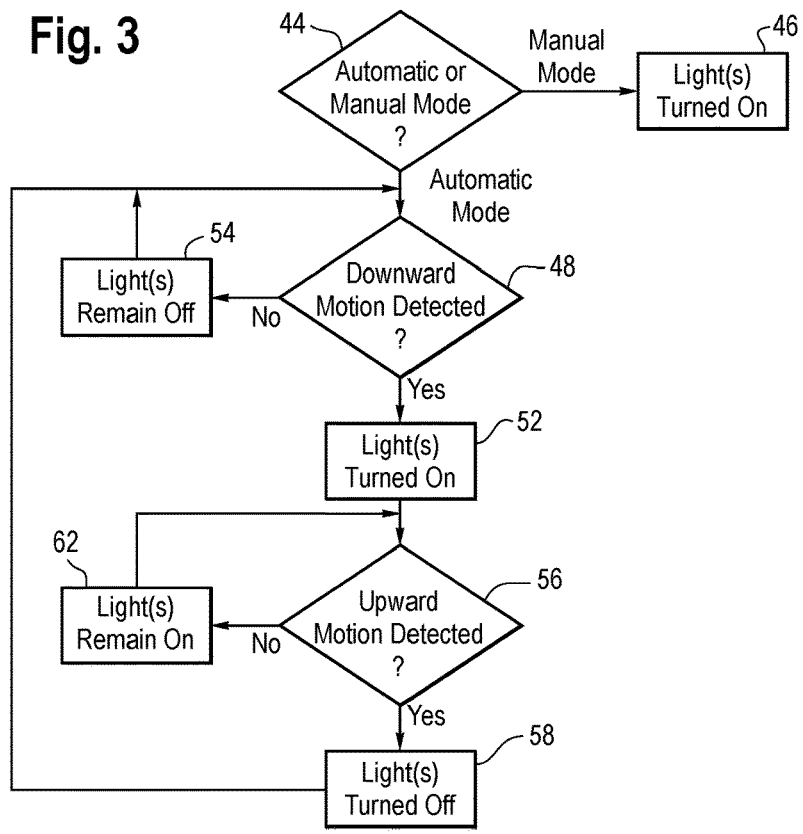
FIG. 3 is a flow chart showing processing performed by the programmable logic controller of the portable lighting device of FIGS. 1 and 2.

As indicated at 44 in FIG. 3, the cap lamp may be configured in either manual mode or automatic mode via a switch (24 in FIG. 2). As a result, as noted previously, the tail and side lamps may be manually switched on, as indicated at 46 in FIG. 3.

If the cap lamp auxiliary lighting switch is configured for an automatic mode of operation, as indicated at 48 of FIG. 3, the controller (26 of FIG. 2) monitors the orientation/motion sensor 42 of FIG. 2 for downward movement, forward or rearward tilting of the cap lamp or any other movement that would indicate that the worker has bent over or otherwise caused the cap lamp to traveled downwards. When the controller receives a signal from the orientation/movement sensor, it sends a signal to the lamp switching module 32 and tail lamp 16 and side lamps 18a and 18b are illuminated, as indicated at 52 in FIG. 3. This enables the miner to be better seen by nearby equipment operators so that pinning or crushing injuries are more likely to be avoided.

The tail and side lamps may be configured to either be steadily illuminated or they may flash to further alert equipment operators of potential danger.

As illustrated at 54 in FIG. 3, the tail and side lamps of the cap lamp remain off if the orientation/motion sensor does not detect downward movement, forward or rearward tilting of the cap lamp or any other movement that would indicate that the worker has bent over or otherwise caused the cap lamp to traveled downwards (and if they are not otherwise illuminated by other cap lamp functionality described below).

As shown at 56 in FIG. 3, after the controller has activated the tail and side lamps of the cap lamp, it monitors the orientation/motion sensor to detect if the miner has stood up or otherwise moved to return to his original upright or elevated position. The controller will turn off the side and tail lamps once this occurs (58 in FIG. 3) to save battery power. The tail and side lamps remain on if he has not done so (62 in FIG. 3).

As shown in FIG. 2, the cap lamp features external motion detectors 64a and 64b that monitor the side or peripheral areas of the miner through openings formed in the sides of the cap lamp housing. The external motion detectors 64a and 64b also are in communication with the cap lamp controller 26. The controller is configured so that when motion, such as by moving machinery, is detected on either side of the cap lamp by the motion detectors, the corresponding side lamp 18a or 18b is illuminated. As a result, the cap lamp provides enhanced lighting to the appropriate side of the miner. If the side lamps are switched on manually so that they are constantly on/illuminated, the controller may be configured to increase the intensity of a side lamp when there is motion detected on the corresponding side of the cap lamp. Suitable motion detectors are well known in the art and readily available.

When the miner is looking at surfaces that are close, the LED main lamp 14 can result in eye fatigue due to glare and high intensity light reflecting off of the surface. To address this issue, as illustrated in FIG. 2, a light intensity sensor 72 is provided. The light sensor 72 may be positioned on the cap lamp housing or within the housing adjacent to an opening that permits it to detect the level of light intensity in front of the cap lamp, and thus the miner. The light intensity sensor 72 communicates with the controller 26. Based on the light intensity detected by sensor 72, the controller adjusts the intensity of illumination provided by the main front lamp 14. As a result, the cap lamp uses feedback to reduce the light output of the main lamp 14 when glare or increased intensity is detected by sensor 72. Suitable light intensity sensors are well known in the art and readily available.

Figure 4:
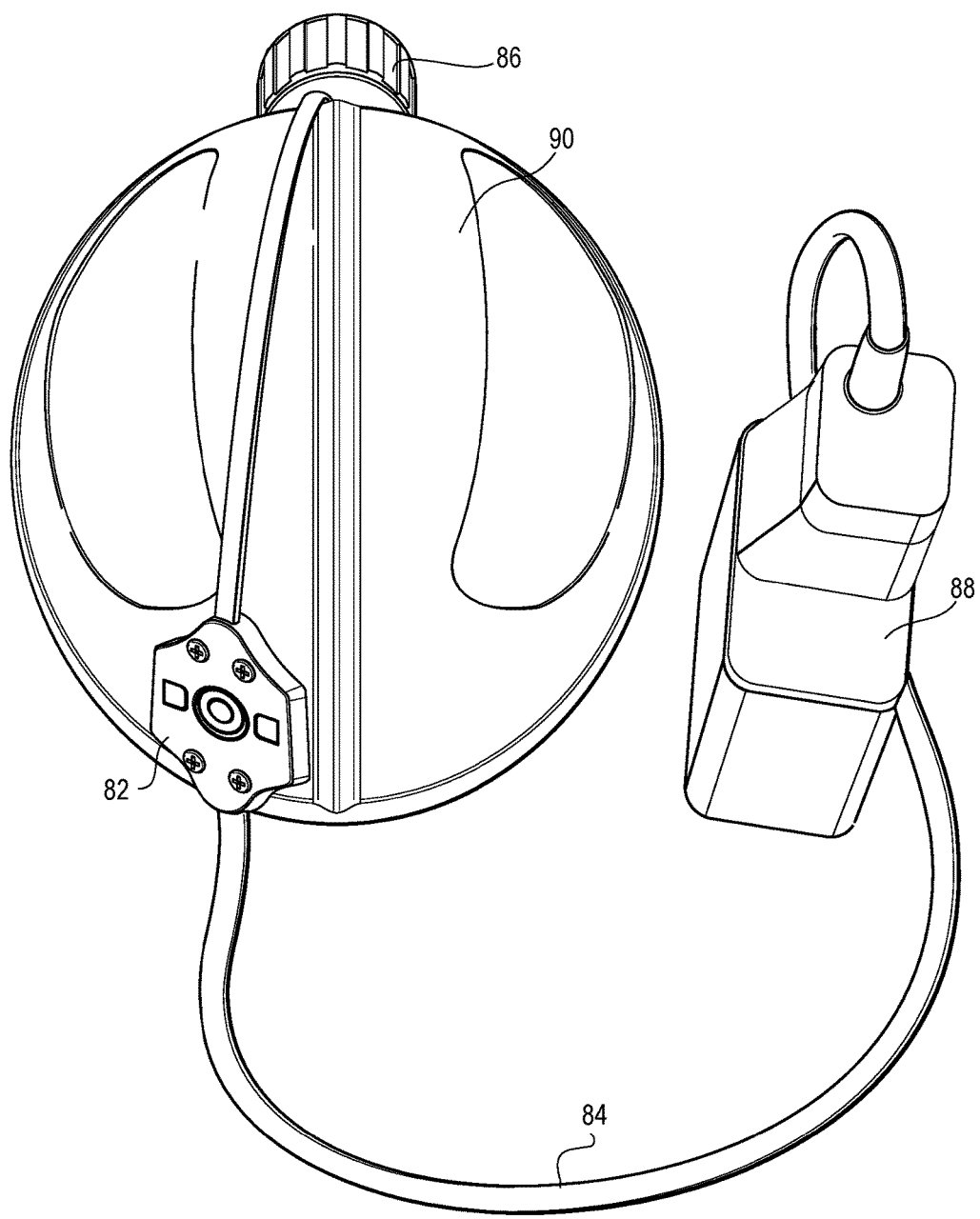
FIG. 4 is a rear perspective view of an inline embodiment of the portable lighting device of the invention.
Figure 5:
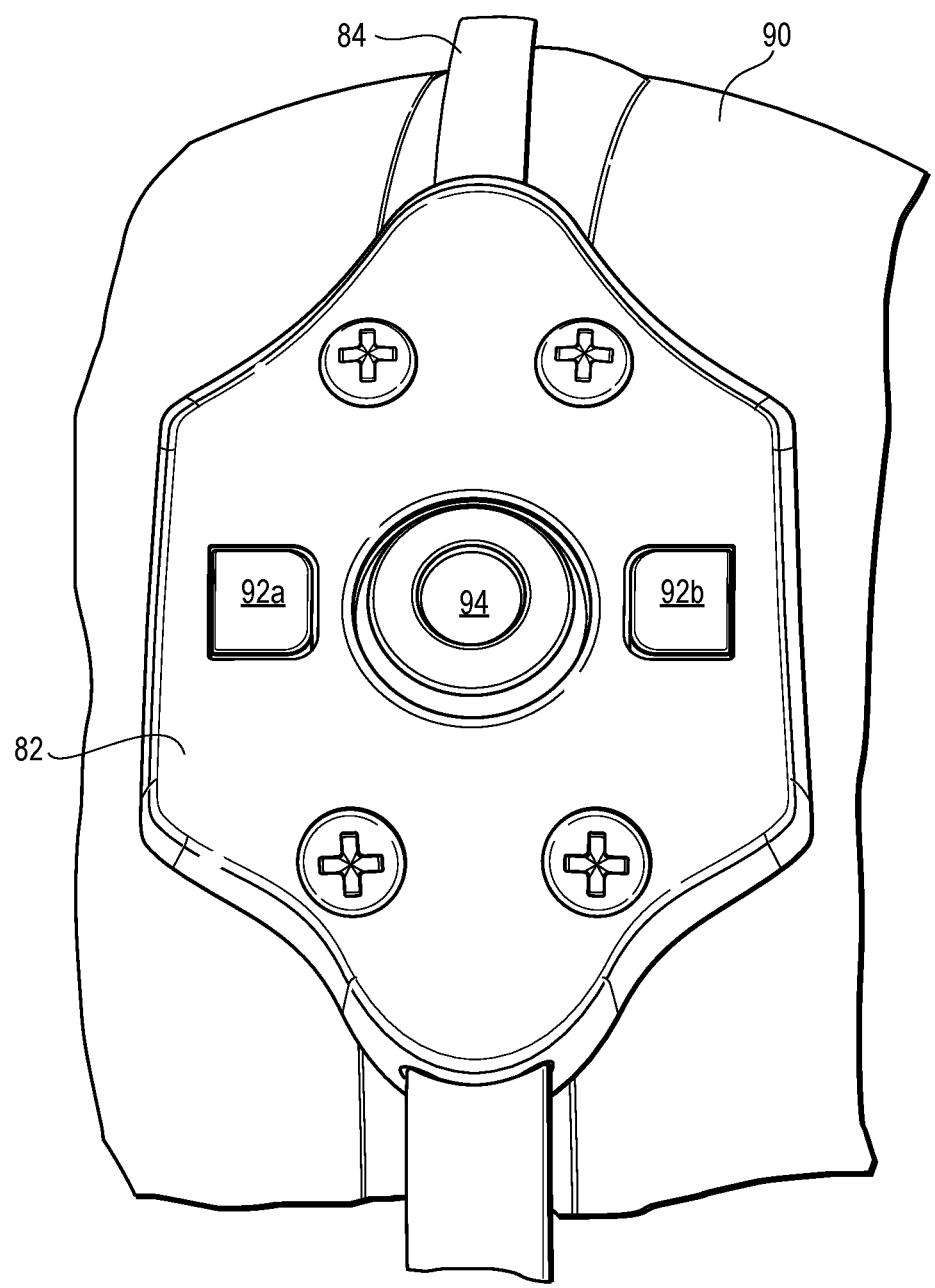
FIG. 5 is an enlarged rear perspective view of the portable lighting device of FIG. 4.

As illustrated in FIGS. 4 and 5, an embodiment of the device may take the form of a cap lamp inline flasher module 82 that is positioned inline or in series circuit with the power cord 84 that provides power to the cap lamp 86 from the battery pack 88. For increased safety (as explained below), the inline flasher 82 is placed at the back of a miners helmet 90 (or other type of headgear) using a fastener such as a clip, a hook and loop fastener; a magnetic fastener or any other type of fastener known in the art.

As illustrated in FIG. 5, the flasher module 82 features a pair of LED lamps 92a and 92b (although any number may be used) that are powered by the battery pack 88 when activated by a push button 94. The LED lamps 92a and 92b preferably flash when activated, but they may alternatively be configured to remain constantly illuminated (or the module may provide selection between the two).

The flasher module 82 may house an orientation/motion sensor and controller (that is configured to control lamps 92a and 92b), as illustrated in FIG. 2, to provide the functionality illustrated in FIG. 3. As a result, an automatic mode of operation is provided where the controller monitors the orientation/motion sensor for downward movement, forward or rearward tilting of the module 82 or any other movement that would indicate that the miner has bent over or otherwise caused the module to travel downwards. When the controller receives such a signal from the orientation/movement sensor, it flashes or otherwise illuminates the pair of LED lamps 92a and 92b. This allows operators of heavy equipment to better see miners in the vicinity so as to reduce injuries and deaths that are the result of a miner that was not seen being pinned or crushed by heavy equipment.

The embodiment of FIGS. 4 and 5 therefore provides a retrofit for existing cap lamp systems.

In alternative embodiments, the lamps of the cap lamp or module could be controlled by a voice input in combination with, or in place of, the motion, gesture, and/or orientation control described above.

It will be appreciated by those skilled in the art that the relative directional terms such as upper, lower, rearward, forward and the like are for explanatory purposes only and are not intended to limit the scope of the disclosure.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A portable lighting device comprising:
a housing;
a main front lamp mounted to the housing and directed in a first direction;
an auxiliary lamp directed in a second direction different from the first direction;
a controller connected to the auxiliary lamp so as to selectively illuminate the auxiliary lamp;
an orientation sensor, connected to the controller, wherein the main front lamp and the auxiliary lamp are operable in a manual mode in which the main front lamp and the auxiliary lamp are selectively activated and deactivated, and wherein in an automatic mode, the controller activates the auxiliary lamp when the orientation sensor detects tilting or downward movement and deactivates the auxiliary lamp when the sensor detects that it is in an upright position; and
an external motion detector connected to the controller, the external motion detector detecting motion on a side of the housing, wherein the controller illuminates the auxiliary lamp when movement is detected by the external motion detector, and wherein the controller varies an intensity of illumination of the auxiliary lamp based on the detected movement.

2. The portable lighting device of claim 1 wherein the controller flashes the auxiliary lamp.

3. The portable lighting device of claim 1 wherein the auxiliary lamp is a first side lamp and further comprising a second side lamp connected to the controller and wherein the external motion detector is a first external motion detector corresponding to the first side lamp and further including a second external motion detector corresponding to the second side lamp, wherein the first and second external motion detectors are connected to the controller and wherein the controller illuminates the first side lamp when movement is detected by the first external motion detector and the controller illuminates the second side lamp when movement is detected by the second external motion detector.

4. The portable lighting device of claim 1 further comprising an illumination intensity sensor connected to the controller wherein the controller is configured to dim the main front lamp when a light intensity detected by the illumination intensity sensor rises above a predetermined level.

5. The portable lighting device of claim 1 wherein the portable lighting device is a cap lamp.

6. The portable lighting device of claim 1 further comprising a a battery connected to the controller and the main front lamp and the auxiliary lamp, wherein the battery, the controller, the main front lamp and the auxiliary lamp are positioned within the housing.

7. A portable lighting device for retrofitting a cap lamp system that includes a cap lamp adapted to attach to a helmet, a battery pack and a power cord supplying power from the battery pack to the cap lamp, the portable lighting device comprising:
a housing adapted to be attached to the helmet;
an auxiliary lamp positioned in the housing;
a controller connected to the auxiliary lamp so as to selectively illuminate the auxiliary lamp;
an orientation sensor connected to the controller, wherein the controller activates the auxiliary lamp when the orientation sensor detects tilting or downward movement, and deactivates the auxiliary lamp when the sensor detects that it is in an upright position; and
an external motion detector connected to the controller, the external motion detector detecting motion on a side of the housing, wherein the controller illuminates the auxiliary lamp when movement is detected by the external motion detector, and wherein the controller varies an intensity of illumination of the auxiliary lamp based on the detected movement,
wherein the auxiliary lamp is adapted to be selectively illuminated by the battery pack.

8. The portable lighting device of claim 7 wherein the auxiliary lamp flashes.

9. The portable lighting device of claim 7 further comprising a switch for manually activating the auxiliary lamp.

* * * * *